United States Patent
Moromisato et al.

(10) Patent No.: US 9,274,674 B2
(45) Date of Patent: Mar. 1, 2016

(54) LIVE COMPANION USER INTERFACE

(71) Applicant: Microsoft Corporation, Redmond, WA (US)

(72) Inventors: George P. Moromisato, San Mateo, CA (US); Noah B. Edelstein, Medina, WA (US); Aditya G. Bhandarkar, San Jose, CA (US); Raymond E. Ozzie, Seattle, WA (US); Abhay V. Parasnis, Los Altos, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/176,057

(22) Filed: Feb. 8, 2014

(65) Prior Publication Data

US 2014/0157185 A1   Jun. 5, 2014

Related U.S. Application Data

(63) Continuation of application No. 11/744,782, filed on May 4, 2007, now Pat. No. 8,677,270.

(51) Int. Cl.
*G06F 3/0481* (2013.01)
*G06F 9/44* (2006.01)
(Continued)

(52) U.S. Cl.
CPC ............ *G06F 3/0481* (2013.01); *G06F 9/4443* (2013.01); *G06F 17/3012* (2013.01); *G06F 17/30126* (2013.01); *G06F 3/048* (2013.01)

(58) Field of Classification Search
CPC ...... G06F 3/048; G06F 3/0481; G06F 3/0483
USPC ......................................................... 715/804
See application file for complete search history.

(56) References Cited

U.S. PATENT DOCUMENTS 5,613,079 A    3/1997  Debique
5,724,556 A    3/1998  Souder
(Continued)

FOREIGN PATENT DOCUMENTS

JP    1997-44334    2/1997
JP    2001-101190   4/2001
(Continued)

OTHER PUBLICATIONS

Reiss, "Here Comes Trouble", Wired Magazine, Feb. 2007, 4 pages, http://www.wired.com/wired/archive/15.02/trouble_pr.html.
(Continued)

*Primary Examiner* — Andrea Leggett
(74) *Attorney, Agent, or Firm* — Judy Yee; Bryan Webster; Micky Minhas

(57) ABSTRACT

An apparatus and method provide a companion application via a companion application corresponding to a host window provided by a host application, the companion window providing information or metadata descriptive of data in the host window. The host application and companion applications may be separate applications such that the host application is unaware of the companion application. The companion application may hook into the host application (e.g., via an application programming interface) and may monitor host application activities and/or data. Based on identification of data or events in the host application, the companion application may obtain information characterizing or providing a context for data provided by the host application. The host window and companion window may be attached to each other, the host window providing host application data and the companion window providing data describing the host application data.

20 Claims, 13 Drawing Sheets

(51) Int. Cl.
*G06F 17/30* (2006.01)
*G06F 3/048* (2013.01)

(56) References Cited

U.S. PATENT DOCUMENTS

| | | | |
|---|---|---|---|
| 5,978,567 A | 11/1999 | Rebane | |
| 5,987,506 A | 11/1999 | Carter | |
| 6,028,602 A | 2/2000 | Weidenfeller | |
| 6,029,171 A | 2/2000 | Smiga | |
| 6,446,077 B2 | 9/2002 | Straube | |
| 6,622,147 B1 | 9/2003 | Smiga | |
| 6,728,713 B1 | 4/2004 | Beach | |
| 6,760,721 B1 | 7/2004 | Chasen et al. | |
| 6,760,828 B1 | 7/2004 | Black | |
| 6,922,757 B2 | 7/2005 | Frank | |
| 6,954,543 B2 | 10/2005 | Svendsen et al. | |
| 6,954,934 B2 | 10/2005 | Kumar | |
| 7,007,041 B2 | 2/2006 | Multer | |
| 7,117,505 B2 | 10/2006 | Lanzatella | |
| 7,191,217 B2 | 3/2007 | Tanabe | |
| 7,207,008 B1 | 4/2007 | Koch | |
| 7,305,437 B2 | 12/2007 | Horvitz | |
| 7,409,423 B2 | 8/2008 | Horvitz | |
| 7,412,534 B2 | 8/2008 | Tsang | |
| 7,660,416 B1 | 2/2010 | Kline | |
| 7,904,323 B2 | 3/2011 | Wynn | |
| 8,533,268 B1 | 9/2013 | Vernon | |
| 2001/0013072 A1 | 8/2001 | Okada | |
| 2002/0133508 A1 | 9/2002 | LaRue | |
| 2003/0009602 A1 | 1/2003 | Jacobs | |
| 2003/0142139 A1 | 7/2003 | Brown | |
| 2003/0167279 A1 | 9/2003 | Smiga | |
| 2003/0195932 A1 | 10/2003 | Tanabe | |
| 2003/0217098 A1 | 11/2003 | Bobde | |
| 2003/0220966 A1 | 11/2003 | Hepper | |
| 2004/0103167 A1 | 5/2004 | Grooters | |
| 2004/0172423 A1 | 9/2004 | Kaasten | |
| 2004/0189694 A1 | 9/2004 | Kurtz et al. | |
| 2004/0252185 A1 | 12/2004 | Vernon | |
| 2004/0268262 A1* | 12/2004 | Gupta et al. | 715/718 |
| 2005/0039139 A1 | 2/2005 | Schwartz | |
| 2005/0086384 A1 | 4/2005 | Ernst | |
| 2005/0114790 A1 | 5/2005 | Dunbar | |
| 2005/0198299 A1 | 9/2005 | Beck | |
| 2005/0203935 A1 | 9/2005 | McArdle | |
| 2006/0036568 A1 | 2/2006 | Moore et al. | |
| 2006/0047584 A1 | 3/2006 | Vaschillo et al. | |
| 2006/0048073 A1 | 3/2006 | Jarrett | |
| 2006/0112076 A1 | 5/2006 | Burris | |
| 2006/0129917 A1 | 6/2006 | Volk | |
| 2006/0136441 A1 | 6/2006 | Fujisaki | |
| 2006/0161516 A1 | 7/2006 | Clarke | |
| 2006/0168154 A1 | 7/2006 | Zhang | |
| 2006/0218492 A1 | 9/2006 | Andrade | |
| 2006/0242581 A1 | 10/2006 | Manion | |
| 2006/0247961 A1 | 11/2006 | Klemow | |
| 2006/0265647 A1* | 11/2006 | Nicholas et al. | 715/530 |
| 2006/0282482 A1 | 12/2006 | Castro | |
| 2006/0288034 A1 | 12/2006 | Do et al. | |
| 2006/0294474 A1 | 12/2006 | Taylor et al. | |
| 2007/0005707 A1 | 1/2007 | Teodosiu | |
| 2007/0033531 A1 | 2/2007 | Marsh | |
| 2007/0124458 A1 | 5/2007 | Kumar | |
| 2007/0226183 A1 | 9/2007 | Hart | |
| 2008/0126480 A1 | 5/2008 | Hintermeister | |
| 2008/0139116 A1* | 6/2008 | Balgard et al. | 455/41.2 |
| 2008/0155112 A1 | 6/2008 | Ma | |
| 2008/0201338 A1 | 8/2008 | Castro | |
| 2008/0256213 A1 | 10/2008 | Carrier | |
| 2008/0276195 A1 | 11/2008 | Moromisato | |
| 2008/0317068 A1 | 12/2008 | Sagar | |
| 2008/0320025 A1 | 12/2008 | Ozzie | |
| 2009/0077262 A1 | 3/2009 | Roberts | |
| 2009/0100151 A1 | 4/2009 | Fisher | |
| 2009/0112870 A1 | 4/2009 | Ozzie | |
| 2009/0138808 A1 | 5/2009 | Moromisato | |
| 2011/0125804 A1 | 5/2011 | Aegerter | |
| 2011/0197287 A1 | 8/2011 | Hess | |
| 2012/0179683 A1 | 7/2012 | Balassanian | |

FOREIGN PATENT DOCUMENTS

| | | |
|---|---|---|
| JP | 2001-292425 | 10/2001 |
| JP | 2005-72826 | 3/2005 |
| WO | WO 2005/099176 | 10/2005 |

OTHER PUBLICATIONS

Grimshaw, "Architectural Support for Extensibility and Autonomy in Wide-Area Distributed Object Systems", Technical Report CS-98-12, Jun. 3, 1998, pp. 1-57.
Carter, "Khazana*An Infrastructure for Building Distributed Services", Published in the Proceedings of ICDCS'98, May 1998, pp. 1-10.
Kistijantoro, "Component Replication in Distributed Systems: a Case study using Enterprise Java Beans", 2001, pp. 1-10.
EP Communication for Application No. 08747364.1-1225 / 2143017 PCT/US2008062240, Reference FB22329, Aug. 28, 2012.
"iLike-Music Social Networking Like Never Before > MakeUseOf.com", Mar. 15, 2007.
Carroll, "SnoopDos 3.0", Sep. 15, 1994.
Horstmann, "Eclipse", Nov. 25, 2006.
"Veeam Monitor for VMware", Dec. 6, 2006.
Chinese Office Action, for Application No. 200880014416.1, date Apr. 25, 2011.
International Search Report for PCT/US2008/062240 mailed Sep. 26, 2008. 11 Pages.
Ivan Voras et al. "Hierarchical File System Interface to Database-Based Content Management Application", ITI 2006.
Greg Stein "WebDAV and Apache", ApacheCon US 2002, 2002.
Simon Scerri, "semantExplorer: A Semantic Web Browser", 2005.

* cited by examiner

LIVE COMPANION USER INTERFACE

RELATED APPLICATION

This application is a Continuation of and claims benefit from U.S. application Ser. No. 11/744,782 that was filed on May 4, 2007, and that is incorporated herein by reference in its entirety.

BACKGROUND

Computer users have access to large amounts of data on their computers. For example, a user may wish to obtain or access data files stored on a computer. In this case, the user may navigate through a series of views to obtain a folder of the desired data files. Although the user may select the desired folder of data files, selection of the data files merely provides the user with the files themselves. Similarly, a user may navigate through a web browser to a particular web page of interest. Selection of elements in the web page such as hyperlinks, applications or the like typically results in navigation to another site or launching of a selected application.

However, users often desire additional information such as additional contextual information pertaining to selected elements in an application. In many cases, such additional information associated with the selected element has been unavailable to the user by selection of the element. Thus, a need exists to provide additional contextual information for selected data or application elements in a convenient and efficient manner.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one example, a host application generates a host window containing data generated by the host application. A companion application, which may be separate from the host application, generates additional information (e.g., metadata) that may describe or provide a context for data or events in the host application. In one example, the companion application obtains the additional information from a separate location rather than creating the additional information. The companion application may further generate a companion window, which may be attached to the host window. The companion window may contain the additional information.

In another example, the host application is oblivious or substantially oblivious to the companion application such that actions or events performed in the companion application do not materially affect the host application. In this example, the companion application may hook into the host application to monitor data within the host application while the host application does not monitor the companion application. Each of the host application and the companion application may generate and display a user interface such as a window containing respective information. The windows may be attached to each other.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Systems described herein are provided as examples and not limitations. As those skilled in the art will appreciate, the present examples are suitable for application in a variety of different types of computing systems.

Figure 1:
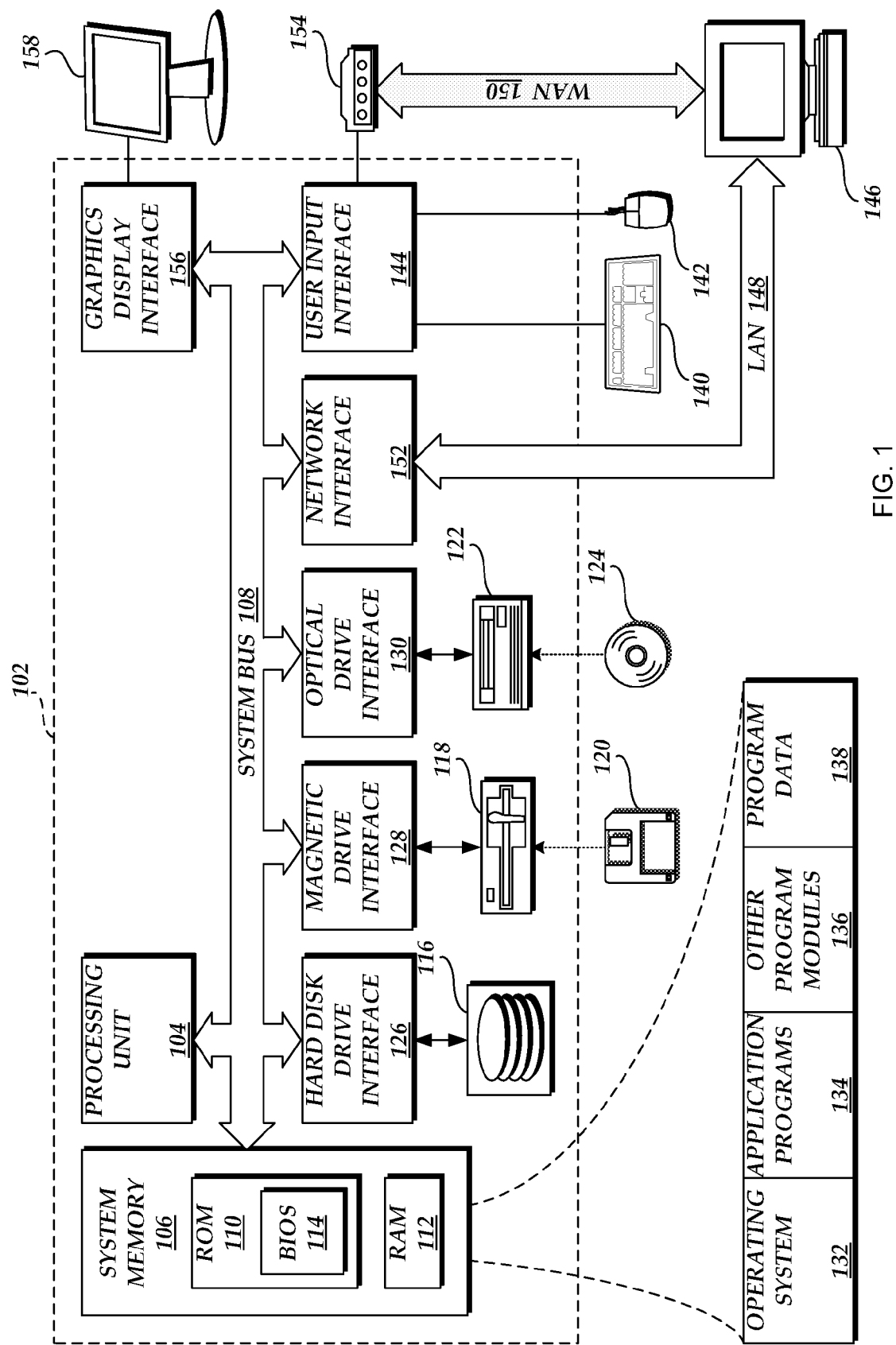
FIG. 1 illustrates an example of a suitable computing system environment for providing a live companion window.

FIG. 1 illustrates an example of a suitable computing system environment or architecture in which computing subsystems may provide processing functionality. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The method or system disclosed herein is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The method or system may be described in the general context of computer-executable instructions, such as program modules, being executed by a computer. Generally, program modules include routines, programs, objects, components, data structures, etc. that perform particular tasks or implement particular abstract data types. The method or system may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the method or system includes a general purpose computing device in the form of a computer 102. Components of computer 102 may include, but are not limited to, a processing unit 104, a system memory 106, and a system bus 108 that couples various system components including the system memory to the processing unit 104. The system bus 108 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 102 typically includes a variety of computer readable media. Computer readable media can be any available media that can be accessed by computer 102 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 102. Combinations of the any of the above should also be included within the scope of computer readable storage media.

The system memory 106 includes computer storage media in the form of volatile and/or nonvolatile memory such as read only memory (ROM) 110 and random access memory (RAM) 112. A basic input/output system 114 (BIOS), containing the basic routines that help to transfer information between elements within computer 102, such as during start-up, is typically stored in ROM 110. RAM 112 typically contains data and/or program modules that are immediately accessible to and/or presently being operated on by processing unit 104. By way of example, and not limitation, FIG. 1 illustrates operating system 132, application programs 134, other program modules 136, and program data 138.

The computer 102 may also include other removable/non-removable, volatile/nonvolatile computer storage media. By way of example only, FIG. 1 illustrates a hard disk drive 116 that reads from or writes to non-removable, nonvolatile magnetic media, a magnetic disk drive 118 that reads from or writes to a removable, nonvolatile magnetic disk 120, and an optical disk drive 122 that reads from or writes to a removable, nonvolatile optical disk 124 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 116 is typically connected to the system bus 108 through a non-removable memory interface such as interface 126, and magnetic disk drive 118 and optical disk drive 122 are typically connected to the system bus 108 by a removable memory interface, such as interface 128 or 130.

The drives and their associated computer storage media discussed above and illustrated in FIG. 1, provide storage of computer readable instructions, data structures, program modules and other data for the computer 102. In FIG. 1, for example, hard disk drive 116 is illustrated as storing operating system 132, application programs 134, other program modules 136, and program data 138. Note that these components can either be the same as or different from additional operating systems, application programs, other program modules, and program data, for example, different copies of any of the elements. A user may enter commands and information into the computer 102 through input devices such as a keyboard 140 and pointing device 142, commonly referred to as a mouse, trackball or touch pad. Other input devices (not shown) may include a microphone, joystick, game pad, pen, scanner, or the like. These and other input devices are often connected to the processing unit 104 through a user input interface 144 that is coupled to the system bus, but may be connected by other interface and bus structures, such as a parallel port, game port or a universal serial bus (USB). A monitor 158 or other type of display device is also connected to the system bus 108 via an interface, such as a video interface or graphics display interface 156. In addition to the monitor 158, computers may also include other peripheral output devices such as speakers (not shown) and printer (not shown), which may be connected through an output peripheral interface (not shown).

The computer 102 may operate in a networked environment using logical connections to one or more remote computers, such as a remote computer. The remote computer may be a personal computer, a server, a router, a network PC, a peer device or other common network node, and typically includes many or all of the elements described above relative to the computer 102. The logical connections depicted in FIG. 1 include a local area network (LAN) 148 and a wide area network (WAN) 150, but may also include other networks. Such networking environments are commonplace in offices, enterprise-wide computer networks, intranets and the Internet.

When used in a LAN networking environment, the computer 102 is connected to the LAN 148 through a network interface or adapter 152. When used in a WAN networking environment, the computer 102 typically includes a modem 154 or other means for establishing communications over the WAN 150, such as the Internet. The modem 154, which may be internal or external, may be connected to the system bus 108 via the user input interface 144, or other appropriate mechanism. In a networked environment, program modules depicted relative to the computer 102, or portions thereof, may be stored in the remote memory storage device. By way of example, and not limitation, remote application programs may reside on a memory device. It will be appreciated that the network connections shown are exemplary and other means of establishing a communications link between the computers may be used.

A method and system is described for providing data to a user in a first user interface, such as a window, and providing additional information corresponding to the data in a second user interface. The first user interface and data contained therein may be generated by a first application and the additional information in the second user interface may be generated by a second application. The first application and the second application may be different applications. For example, the second application may be a separate and distinct application from the first application and may further contain executable code which, upon execution, causes the second application to hook into the first application. In this example, the second application may monitor the first application and the data provided by the first application. Monitoring of the first application by the second application may be accomplished in a variety of ways. For example, the monitoring may include observing and/or tracking actions or events taken or performed in the first application. Data generated by the first application resulting from one or more actions or events occurring in the first application may further be observed or tracked by the second application. Based on the observations by the second application of the events, actions, or generated data in the first application, the second application may generate, obtain, identify, or retrieve additional data. The additional data may be data that is distinct or different from the data generated in the first application and may describe or characterize the events, actions, or generated data in the first application. In another example, the second application may observe events, actions or generated data in the first application via a third application. For example, the second application may monitor a monitoring application (e.g., file system watcher), which may observe the events, actions, or generated data in the first application. The second application may receive updates or event information from the monitoring application. In this example, the second application does not directly monitor or observe the first application. Rather, the monitoring application may observe the events and generate information pertaining to events at the first application. This information may be available to the second application Thus, based on the first application or the data provided by the first application, the second application may obtain additional data or information and may provide the additional data or information in the second user interface. In one example, the second application may obtain the information from an operating environment in which the first and/or second application is running. The information obtained from the operating environment may further be selected based on any actions or events from the first application. In another example, the data obtained by the second application from the operating environment describes or characterizes the data provided by the first application but is different from the data provided by the first application. Thus, in this example, the data provided by the first application does not contain the information provided by the second application and the information provided by the second application does not include the data provided by the first application.

In another example, the second application hooks into the first application and monitors the first application, however, the first application functions independently from the second application. When the first application functions independently from the second application, actions or events performed by the second application do not materially effect the actions or events taken at the first application. Thus, for example, if a command is executed by the second application and the first application functions or operates independently from the second application, the first application performs actions and other functions in materially the same fashion as if the command at the second application had not been executed. In other words, the first application functioning independently from the second application refers to a condition in which activity of the first application is substantially unaffected by any activity performed at the second application. Also, removal of the second application has no substantial effect on the first application if the first application operates independently from the second application.

Alternatively or additionally, the first application may be oblivious or substantially oblivious to the second application while the second application monitors the first application. In one example, the first application is oblivious or substantially oblivious to the second application which refers to a state in which the first application is unaware or substantially unaware of the second application. By being unaware of the second application, the first application performs any functions as if the second application is not present and/or not executing or operating. In a case in which the first application is oblivious or substantially oblivious to the second application, the second application may be removed entirely and the impact of the removal of the second application on any aspect of the first application is minimal or non-existent. In another example, the first application is oblivious to the second application but contains instructions received from the second application.

Also in this example, the second application may monitor the first application for providing a condition in which the second application is aware of activities and/or events performed by the first application and may also be aware of data generated by and/or output or displayed by the first application. At the same time, the first application is substantially oblivious to the second application such that the first application may be substantially unaware of any information provided by the second application or actions/events performed at the second application.

Alternatively or additionally, the second application may observe or monitor the first application but may not control or otherwise modify the first application. In this example, the second application may monitor the information generated by the first application but does not change the generated information. The second application may generate additional information based on the observed generated information from the first application and provide the generated additional information to a user. However, in this example, the second application does not control, modify, or otherwise affect the information generated by the first application. Also, the first application may not control the additional information generated by the second application. Additionally, the first application may also be substantially oblivious of the second application such that the first application is substantially unaware of the additional information generated by the second application. In this example, activities and functions performed by the first application are unaffected by the presence, absence, or operation of the second application.

In another example, the second application hooks into the first application via an application programming interface. The first application may contain an interface such as an application programming interface (API) through which a second application may access the first application. For example, the second application may execute to access the first application via the API (or by any other means) to obtain information on a characteristic of an aspect of the first application such as, but not limited to, data generated or output by the first application, a state of the first application, or a context of the first application.

Figure 2:
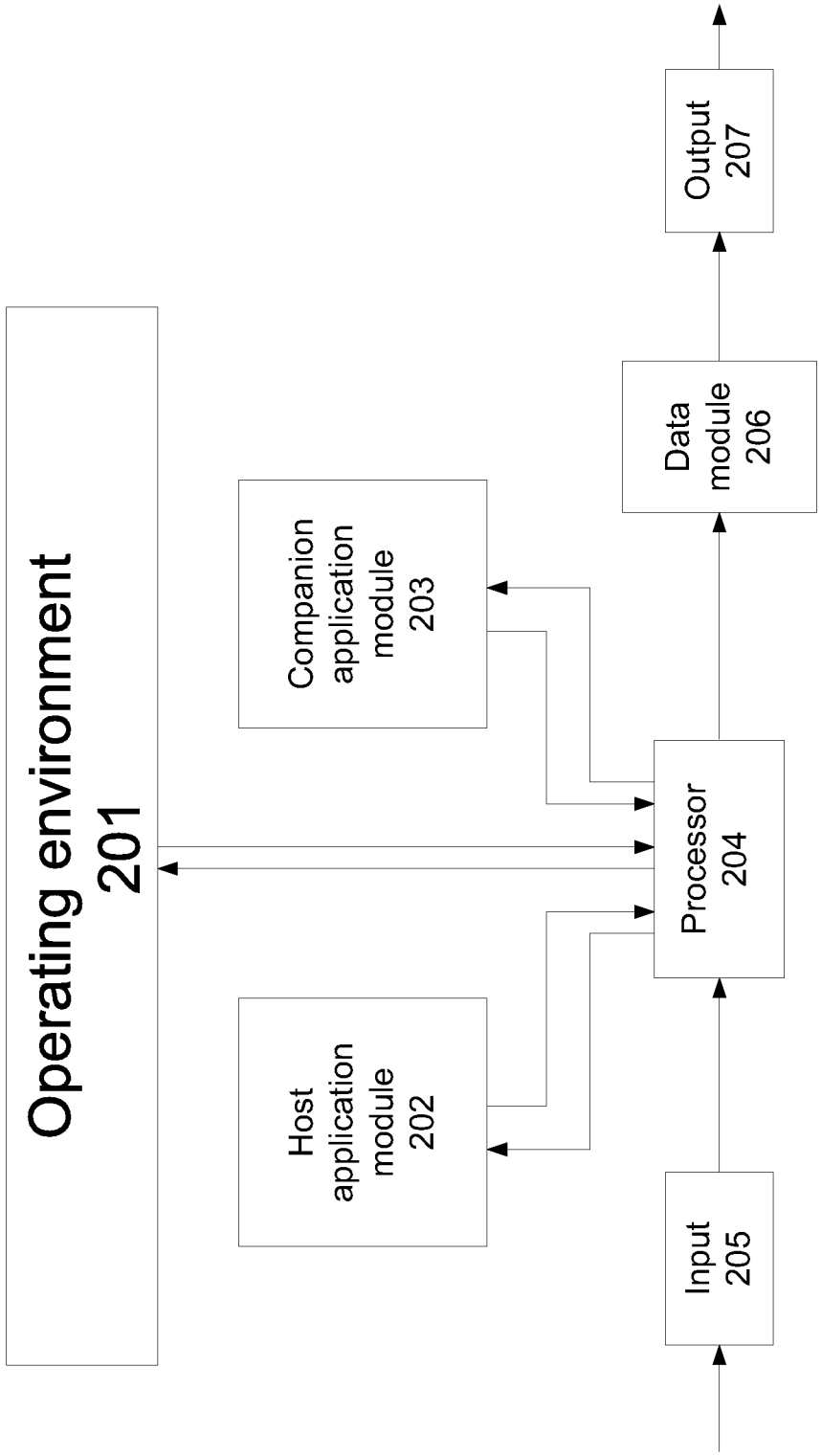
FIG. 2 illustrates one example of a system for generating information or metadata pertaining to data of interest.

FIG. 2 illustrates one example of a system for generating information or metadata pertaining to data of interest. The system may include an input 205 which may receive any type of input, such as user input. For example, a user may input a command via input 205 to the system for performing an action or event or selecting information. In one example, a list of choices may be displayed on a display device and a user may select an item or choice from the display.

A processor 204 may receive an input command via input 205 and may process data accordingly. In one example, the system includes a host application module 202 for executing a host application. The host application may be any number of types of applications for providing data or information. For example, the host application may include an application for providing a display of folders, action items, calendar information, e-mail information, etc. Any relevant information may be provided by the host application. The host application module 202 may execute to generate the relevant information and may further provide a user interface for providing the relevant information. The processor 204 may instruct the host application module 202 to provide the relevant information and user interface. In addition, the information from the host application module 202 may further be forwarded from the processor 204 to a data module 206 for formatting, adjustment, etc. and may further be output via output 207.

The system may further include a companion application module 203 for obtaining and providing additional information. The additional information provided by the companion application module 203 may be selected based on information generated by the host application module 202. In addition, the additional information may be located at or obtained from any number of data sources. For example, the companion application module 203 may locate and obtain the information from the operating environment 201.

The companion application module 203 may further include the additional information in data output via the data module 206 and output 207. The additional information may contain any type of information of relevance to the information generated by the host application module 202. For example, the host application module 202 may generate data including a list of folders or files stored on a computing device. A user may input a selection of a desired folder or file via input 205 which may be further processed by processor 204. Based on the selection input, the processor 204 may control the host application module 202 to select the desired selection. For example, the host application module 202 selects the desired folder or file selected by the user.

The companion application module 203 may execute to monitor the host application module 202. In this example, the companion application module 203 hooks into the applications such that the companion application monitors the activities and/or events performed at the host application module 202. The companion application may monitor any element or component of interest in the host application. For example, the companion application may monitor files generated by the application process or may monitor components or events that are separate from the application process itself. In addition, the companion application module 203 may further monitor the data generated by the host application module 202. In this case, the host application module 202 selects a desired folder. The companion application module 203 may detect the selection by the host application module 202 and may further obtain additional information such as metadata pertaining to the desired folder. The companion application module 203 may obtain the additional information or metadata in any number of ways. For example, the companion application module 203 may obtain the desired information from the operating environment 201 and may provide the obtained desired information to the processor 204 and/or data module 206. The desired information may be output via output 207.

Alternatively or additionally, the host application module 202 may be oblivious to the companion application module 202 such that the actions performed or data generated at the host application module 202 may be unaffected by activities or actions performed at the companion application module 203. Conversely, the companion application module 203 monitors activity and/or data generated at the host application module 202. Hence, in this example, the companion application module 203 is aware of (or not oblivious to) host application module 202.

Figure 3:
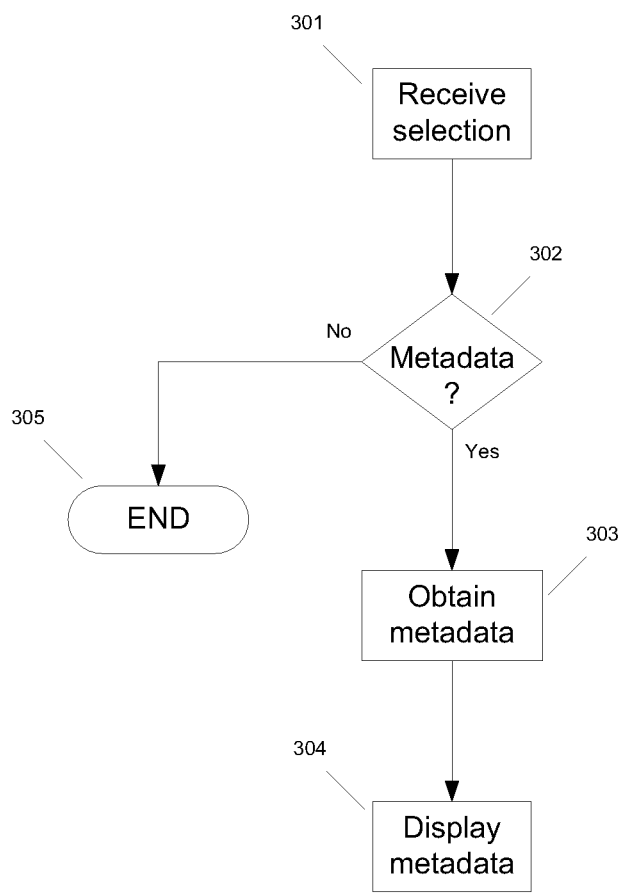
FIG. 3 is a flowchart that illustrates one example of identifying and/or obtaining metadata.

FIG. 3 is a flowchart that illustrates one example of identifying and/or obtaining metadata. Data may be displayed on a device including any relevant information of interest. The data may further be displayed within a user interface. For example, a window corresponding to an application may be displayed on a display device. The window may contain information such as folders contained on a computing system, a web page containing any number or type of elements (e.g., hyperlinks, other applications, graphic images, etc.), list of contacts, calendar information, appointments, images, list of files, etc.

A selection may be received (STEP 301) such as the selecting of a displayed component from the data displayed on the device. The selection may correspond to a selection of a displayed folder, a hyperlink, a contact, or any type of relevant information and may include any action in the first window. For example, the action may include moving a cursor or mouse to a particular part of the first application window without actual selection or activation of the mouse.

The presence or availability of metadata corresponding to the displayed data may be determined (STEP 302). If no metadata is available ("No" branch of STEP 302), the process ends (STEP 305), otherwise the relevant metadata is received (STEP 303) and displayed (STEP 304). In this example, metadata includes any information that describes, characterizes, or provides a context for other data. Thus, the metadata includes information that describes any of the data generated or provided by the first application or any action taken by or performed in the first application.

For example, a first application may execute to provide a list of choices of elements to be selected. A selection of one of the choices from the list of elements is received (STEP 301). Metadata (i.e., information that describes aspects of other data) may be identified by a second application. The second application which may be different, separate, and/or distinct from the first application, may execute to monitor, observe, or track the first application and/or data generated or provided by the first application. The second application may determine if metadata is available corresponding to the selected element from the list of elements from the first application. In one example, metadata is identified and located in the operating environment in which the first application and/or second application is executing. The operating environment may include any computing device, operating system, peripheral devices, remote devices, etc. The second application may obtain the metadata (STEP 303) and may further display the metadata (STEP 304).

The second application may further display the metadata to describe, characterize, or provide a context for the data generated by and displayed by the first application in a separate user interface. For example, the second application is a separate, different, and distinct application from the first application where each of the first application and the second application generates a user interface. The second application may contain executable code the execution of which causes the second application to hook into the first application. After the second application hooks into the first application, the second application may provide a user interface in cooperation with the first application. In this example, the second application monitors the actions of the first application but the first application does not monitor the actions of the second application. For example, the first application may be oblivious to the second application such that the first application is unaware of the actions and/or events performed by the second application.

Thus, in this example, the first application generates data and a user interface for providing the generated data. The second application, which is a different, distinct, and separate application from the first application, may hook into the first application and may monitor actions or events performed in the first application. Also, the second application may observe or track data that is generated by the first application. Based on the data generated by the first application and observed/tracked by the second application, the second application may locate and/or obtain metadata associated with the data generated by the first application. The metadata may include any information that describes, characterizes or provides a context for the data generated by the first application.

Additionally, the second application may generate a user interface separate and distinct from the user interface generated by the first application. The second application may also provide the metadata (i.e., data describing data generated by the first application and/or provided by the first application in the first application user interface). The second application may provide the metadata in the user interface generated by the second application.

Also, the user interface generated by the first application may be connected or attached to the user interface generated by the second application. As described in more detail below, the user interface generated by the first application and the user interface generated by the second application may be adjacent to each other or attached to each other. Also, the user interfaces may be non-overlapping such that no part of either of the user interfaces obscures any part of the other user interface. Such user interfaces may be adjacent to each other and connected or attached to each other. In addition, modifications to any one of the user interfaces may be performed on both of the user interfaces as a single unit as described in further detail below.

Figure 4:
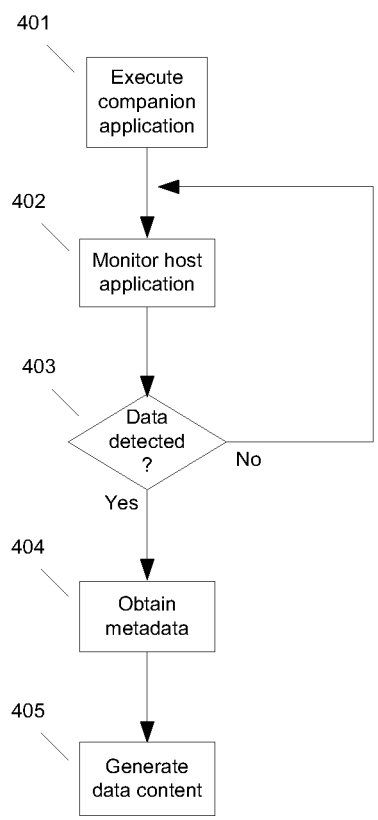
FIG. 4 is a flowchart illustrating an example of generating data content and providing additional information describing or characterizing the data.

FIG. 4 is a flowchart illustrating an example of generating data content and providing additional information describing or characterizing the data. In this example, a host application and a companion application generate or obtain data content. In STEP 401, the companion application executes. Execution of the companion application may include, for example, monitoring a host application (STEP 402) such as detecting actions or events occurring in the host application. Also, execution of the companion application may include the companion application detecting data generated or provided by the host application (STEP 403).

In another example, the companion application monitors the host application but does not otherwise alter or modify the host application. For example, executable code associated with the host application remains unchanged with respect to the presence or the activities of the companion application. In yet another example, the host application is oblivious to the companion application. For example, the host application may function in a predetermined manner if the companion application is absent or inactive and may function in the same predetermined manner if the companion application is present or active.

If the companion application detects data in the host application ("Yes" branch of STEP 403), the companion application may obtain metadata corresponding to the detected data in the host application. The companion application may obtain the metadata from any number of sources. For example, the companion application may locate and/or obtain the metadata from an operating environment in which the host application and/or the companion application is/are running.

The companion application may further generate data content (STEP 405) based on the detection of the detected data from the host application. The data content from the companion application may further be output to a user or may be stored, if desired. The data content generated by the companion application may include information based on the metadata obtained from the operating environment. For example, the data content may include lists of topics, people, objects, entities, etc. that are related to at least a portion of the data detected from the host application.

Figure 5:
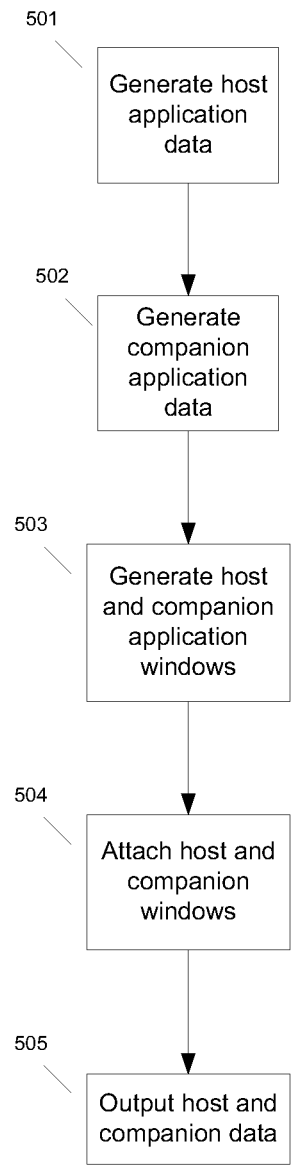
FIG. 5 is a flowchart illustrating another example of a method for providing data.

FIG. 5 is a flowchart illustrating another example of a method for providing data. In this example, a host application executes to generate data of interest (STEP 501). The data of interest from generation of the host application may include any data such as, for example, stored folders, contact information, calendar or e-mail information, web-related information such as hyperlinks, etc. Also, a companion application which may be separate and distinct from the host application may be executed to generate additional data (STEP 502). The additional data may include, for example, metadata that describes, characterizes, or provides a context for a state, content, or selection of the data generated by the host application.

The host application and the companion application may each generate a user interface such as a window (STEP 503). In this example, the host application and the companion application each generate a separate and distinct window in which the companion application window ("companion window") is attached to the host application window ("host window") (STEP 504). The companion window may be attached to the host window such that actions or modification applied to any one of the companion window or the host window results in the action or modification applying to both of the windows. For example, if the host window is maximized in size on a display, the host window and the companion are each modified proportionally such that the proportional dimensions of the host window and the companion window remain substantially the same while the combination of the host window and the companion window are maximized to the size of the display region in which the host window and companion window (or combination of the two windows) are displayed.

In addition, the data generated by the host application may be displayed or output in the host window and the data or metadata obtained or generated by the companion application may be displayed or output in the companion window (STEP 505). The data generated by the host application may be substantially different from the metadata obtained or generated by the companion application. Thus, in this example, the data generated by the host application contains may contain none of the metadata obtained or generated by the companion application and the metadata obtained or generated by the companion application may contain none of the data generated by the host application.

Figure 6:
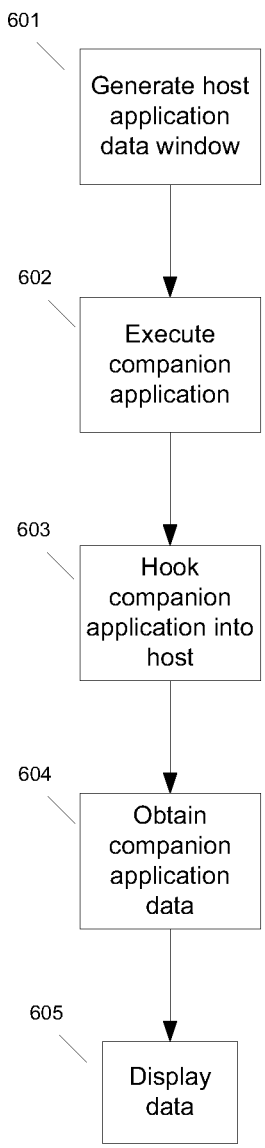
FIG. 6 is a flowchart illustrating an example of connecting a host application and a companion application to provide data.

FIG. 6 is a flowchart illustrating an example of connecting a host application and a companion application to provide data. In this example, a host application executes to generate a user interface such as a window (STEP 601). The user interface may be displayed on a display device. Also, a companion application may also execute (STEP 602) to generate a corresponding companion user interface. The companion application may further hook into the host application (STEP 603). For example, the host application may contain an application programming interface (API) and the companion application may access the API of the host application to hook into the host application. The companion application may further monitor the host application while the host application may be oblivious to the companion application. Additionally or alternatively, the host application may function independently of the companion application such that the functioning of the host application is unaffected by the functioning of the companion application.

The companion application may further generate additional information pertaining to data generated by the host application. For example, the companion application may detect data generated and/or provided by the host application and, based on the detected data, the companion application may locate and/or obtain additional information (e.g., from the operating environment). The additional information may include metadata that describes or provides a context for the detected data from the host application. The additional information (e.g., metadata) may be output to a user. For example, the additional information may be displayed (STEP 605).

Figure 7:
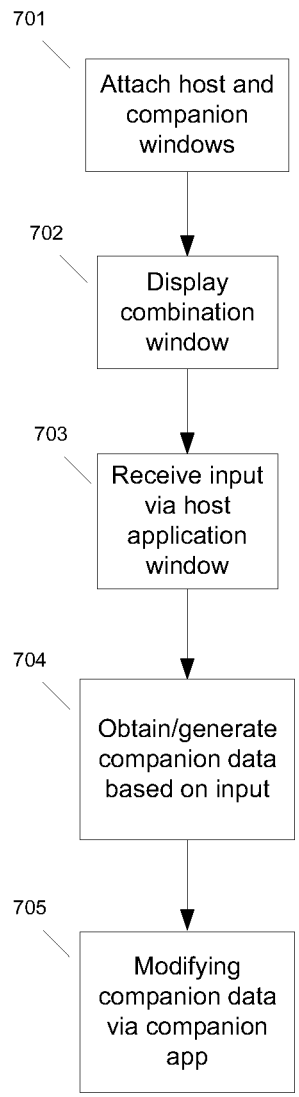
FIG. 7 is a flowchart illustrating an example of attaching and/or modifying windows associated with different applications.

FIG. 7 is a flowchart illustrating an example of attaching and/or modifying windows associated with different applications. In STEP 701, a host application window is attached to a companion application window. In this example, the companion window is attached to the host window to form a combination window that includes both the companion window and the host window. The companion window may be adjacent to the host window, may be attached to the host window, and may share one aspect with the host window. For example, the host window may have a left side, a right side, a top side and a bottom side. The companion window may also have a left side, a right side, a top side and a bottom side. The companion window may be adjacent and connected to the host window such that the left side of the companion window is in contact with the right side of the host window. Also, the host window and companion window in this example are in contact but are non-overlapping. When the host window and companion window are non-overlapping, the host window is not obscured by the companion window. Likewise, the companion window is not obscured by the host window. It is noted that the above description is merely one example and any side of the companion window may be connected to any side of the host window to be attached in the combination window.

In STEP 702, the combination window is displayed. Also, the combination window may be altered or modified as a single unit such that modifications to one of the components of the combination window may apply to the other components of the combination window. For example, the combination window may include a host window attached to a companion window. A user may move the host window from a first location on a display to a second location on the display. Movement of the host window of the combination window results, in this example, in a tandem movement of the companion window. When a host window and a companion window move or is otherwise altered or modified in tandem, the host window and the companion window are moved, altered, or modified in a substantially similar fashion. Hence, in the combination window in which the host window and the companion window are modified in tandem, the host window and companion window are acted upon or modified at a single unit in which changes are applied proportionally to both the host window and the companion window.

In STEP 703, an input is received at the host application window. For example, a user may select from a menu of selections provided on the host application window. The selection may include any number or type of elements. For example, the selection may be a selected folder that may contain data files stored on a computing system. The selection may also be a selection on a website, a contact on a contact list, an item on a "to-do" list, an appointment on a calendar, etc. Any selection may be provided in the host application window and may be selected.

In STEP 704, the companion application may detect the input or selection in the host application. For example, a user may select an element from a list of elements generated or obtained by the host application. The companion application may detect the user selection and, based on the selection, the companion application may locate and/or identify additional information, such as metadata, associated with the selected item in the host application. For example, the selection may include a folder of data files. The companion application may identify the selection as a folder of data files and may further locate information associated with the folder. In one example, the companion application locates the additional information pertaining to the folder in the operating environment. The identified or located additional information may not be accessed or provided by the host application. Also, the host application may not have an awareness of the actions or events performed at the companion application (e.g., locating the additional information). As such, the host application may be oblivious to the companion application. The data content obtained or located by the companion application in this example may include additional information associated with the selected folder. For example, identities of user having access rights to the folder may be obtained by the companion application and may further be provided or output in a user interface corresponding to the companion application (e.g., the companion window). Any additional information describing or providing a context for the data from the host application (e.g., the folder) may be similarly obtained and provided by the companion application.

In another example, the additional information provided by the companion application in the companion window may be modified. For example, the information may be updated in real-time as conditions pertaining to the selected data in the host application change. Also, the host application may be oblivious or unaware of changes to the selected data in the context of the additional data provided by the companion window. In this example, the companion application hooks via an API into the host application to provide a companion window containing additional information describing or otherwise providing a context for selected data in the host application window. Also, the additional data provided in the companion window may be updated based on changes to the data in the host application while the host application may be oblivious or unaware of the presence or activity of the companion application. In yet another example, the host application may be oblivious or unaware of the changes to the data in the host application.

Figure 8:
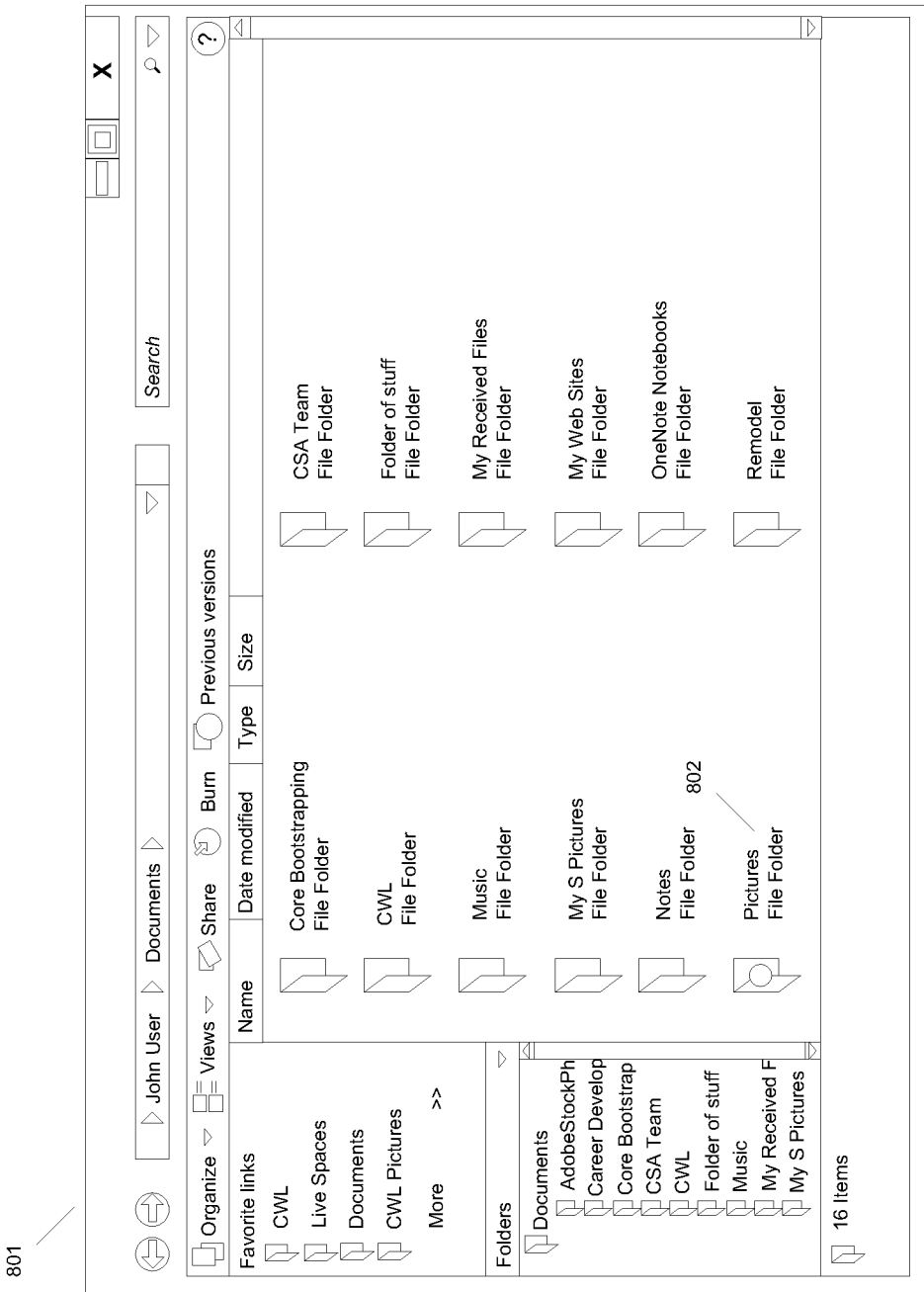
FIG. 8 illustrates an example of a window as a user interface of a host application.

FIG. 8 illustrates an example of a window as a user interface of a host application. In this example, the host application may include Explorer, however, any host application capable of providing a user interface may be used. For example, the host application may be a browser, a word processing document, a spreadsheet document, etc. In the example illustrated in FIG. 8, the window 801 contains icons corresponding to file folders of data stored on a computing system. For example, one folder of data provided in the window 801 of the host application is a folder containing "Pictures" 802.

Figure 9:
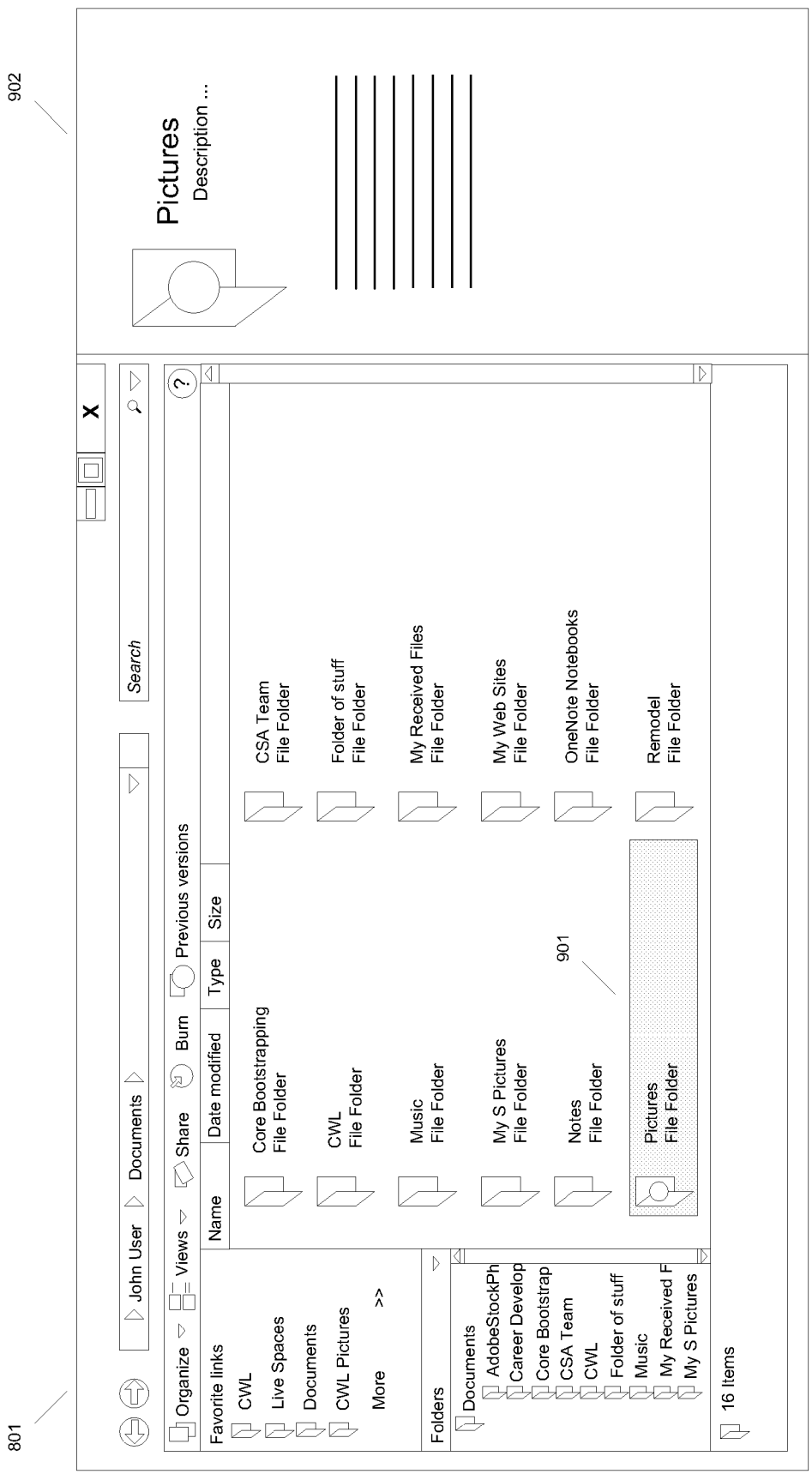
FIG. 9 illustrates an example of the host window with an attached companion window.

FIG. 9 illustrates an example of the host window 801 of FIG. 8 with an attached companion window 902. In this example, a host application generates data and a host window 801. The host application outputs or displays the generated data in the host window 801. As FIG. 9 illustrates, data generated by the host application includes a file folder entitled "Pictures" 901. the file folder 901 is displayed within the host window 801.

Also, a companion window 902 may be generated by a companion application. The host application may be separate and distinct from the companion application and may generate the host window 801 and the data provided in the host window 801 independently of the companion application or the companion window 902. For example, the host application may be oblivious or substantially oblivious to the companion application such that the state of actions or events performed in the host application and data provided or displayed in the host window 801 is maintained in the same or substantially the same state regardless of the state of the companion application or the companion window 902.

In the example illustrated in FIG. 9, the companion application generates the companion window 902. Also, the companion window 902 is attached or connected to the host window 801 and provides information associated with at least a portion of the data generated by the host application and provided in the host window 801. In this example, the "Pictures" folder 901 in the host window 801 is selected. The companion application may hook into the host application and monitor the host application and detect the selection of the file folder 901. Based on the selection of the Pictures folder 901, the companion application obtains additional data describing the selected file folder 901. For example, the companion application may locate or receive the additional data from an operating environment.

As FIG. 9 also illustrates, the additional data, which may include metadata describing the selected data in the host window 801 (e.g., the "Pictures" folder 901), may be displayed by the companion application in the companion window 902. As indicated above, the companion window 902 may be attached or connected to the host window 801 such that manipulations or modifications to the host window 901 may be proportionately applied to the companion window 902. For example, resizing, minimizing, or maximizing the host window 801 may result in an equivalent or proportional modification in the companion window 902. Hence, in this example, the host window 801 and the companion window 902 may be modified, moved, etc. in tandem.

Figure 10:
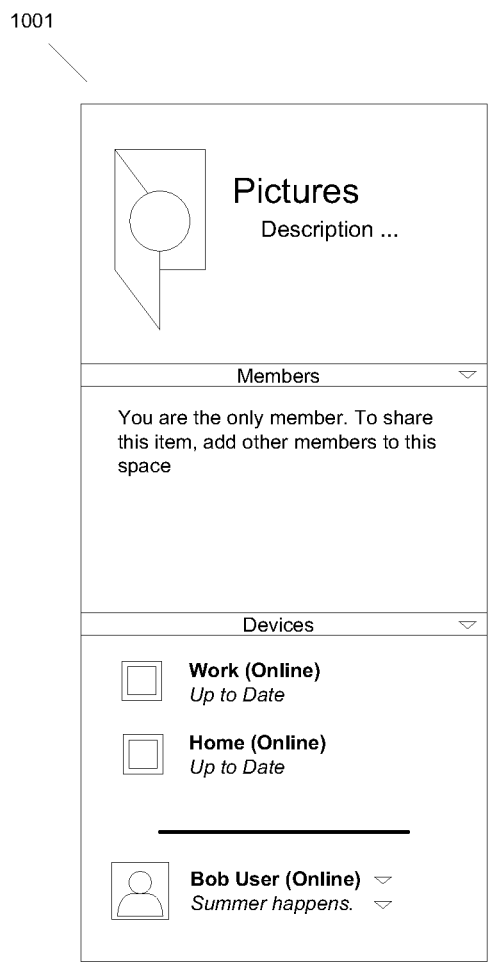
FIG. 10 illustrates an example of a companion window with metadata.

The companion window 902 may contain any relevant information, such as metadata, that describes, characterizes or provides a context for the state, selection or content of the data provided in the host window 801. FIG. 10 illustrates an example of a companion window and the metadata contained therein. In this example, a companion window 1001 contains a name or other identifier of data selected in a host window. In this case, the selected data is the "Pictures" folder 901 displayed in the host window 801 of FIG. 9. The companion window 1001, which may be attached or connected to the host window 801 such that one aspect of the companion window 1001 abuts an aspect of the host window. In this example the companion window and the host window are attached but are non-overlapping.

In the example of the companion window illustrated in FIG. 10, the companion window 1001 may further include member names or identifiers. In this example, the member names identified may correspond to individuals who have access to share a particular data. In this example, members sharing access to the "Pictures" folder 901 may be listed in the companion window.

Additionally or alternatively, the companion window may include a list of devices that are capable or authorized to access a particular data. For example, a user may have multiple devices (e.g., a home computer and a work computer). Any of the multiple devices having access to the specified data may be listed in the companion window. Any additional information pertaining to the selected data in the host window may be included in the companion window.

Figure 11:
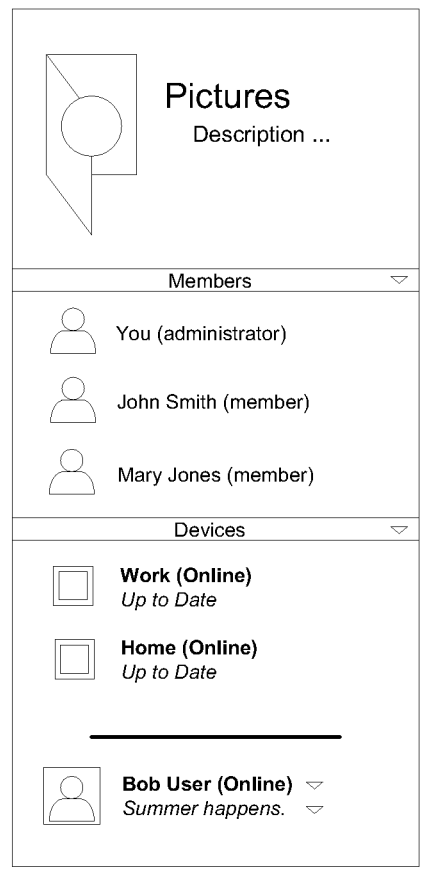
FIG. 11 illustrates another example of a companion window.

FIG. 11 illustrates another example of a companion window. In this example, the companion window 1101 contains a list of members who share access to a selected data, the selected data being from a host application. The host application may further be unaware of the companion application such that the host application functions in a substantially similar manner regardless what the companion application does or even whether or not the companion application is present, active, or operational.

Figure 12:
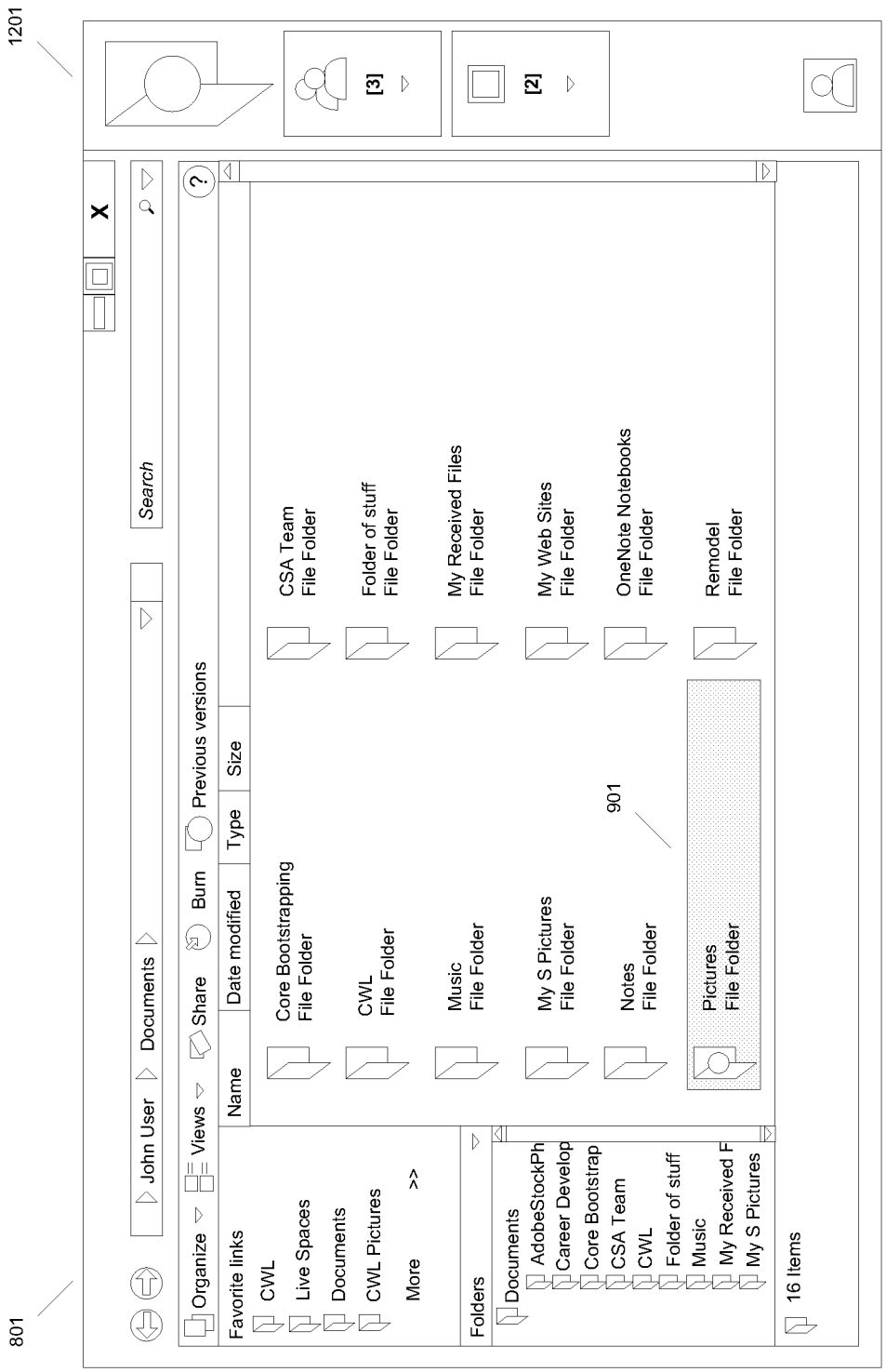
FIG. 12 illustrates an example of a host window with a re-formatted companion window.
Figure 13:
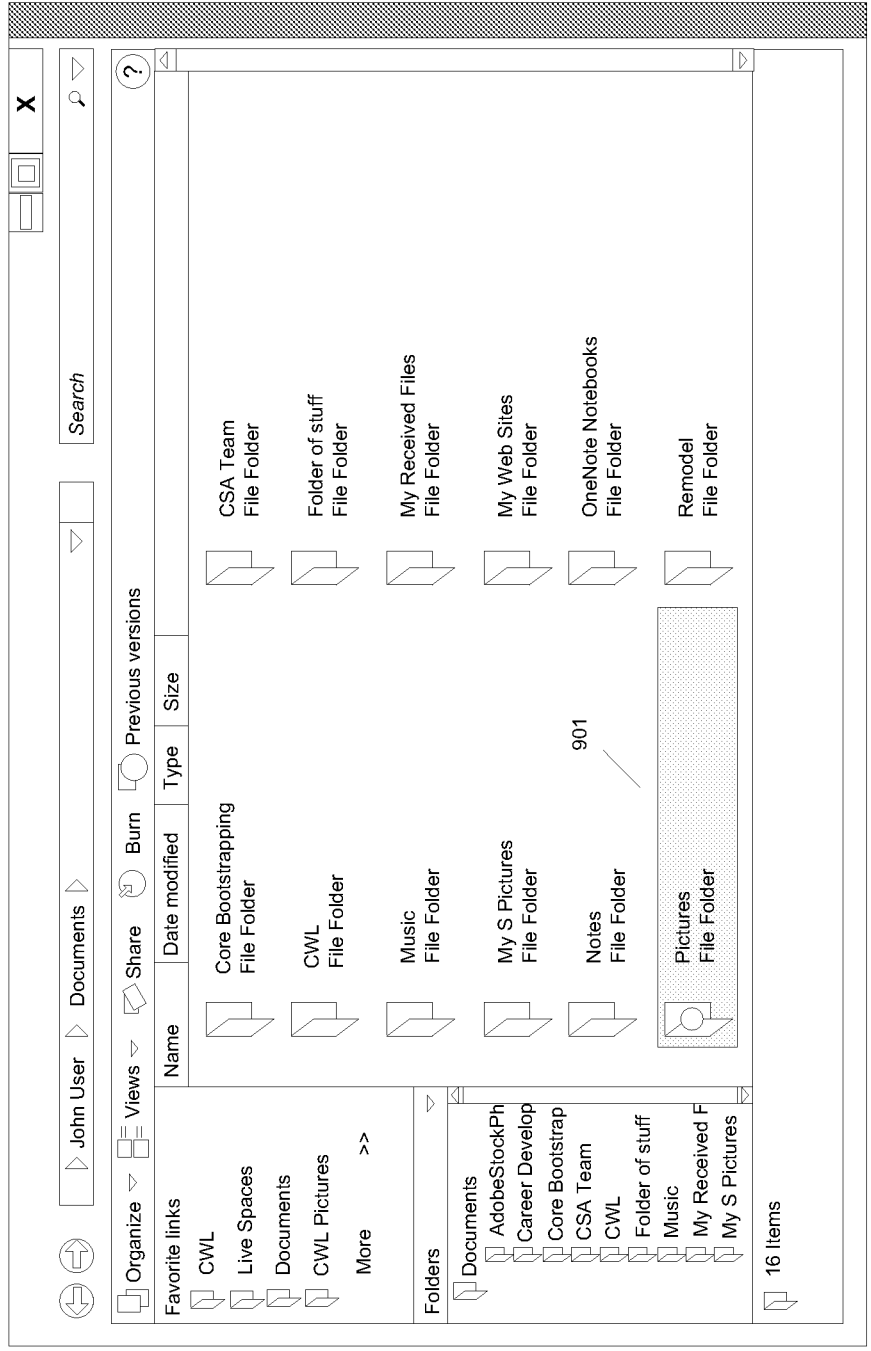
FIG. 13 illustrates another example of a host window with a collapsed companion window.

In addition, the companion window may be provided in various forms. For example, the companion window may be altered to different sizes to provide additional space for other displayed components (such as the host window) on the display. FIG. 12 illustrates the example of FIG. 9 in which the companion window 1201 is reduced in size with elements within the reduced companion window displayed as icons. FIG. 13 illustrates the example of FIG. 9 in which the companion window is further reduced in size such that the companion window 1301 is collapsed. The collapsed companion window 1301 may further provide an indication of the status of the companion window 1301, for example, by altering the color, pattern, shade, tone, etc. of the collapsed companion window 1301. The altered companion window (1201, 1301) of FIG. 12 or FIG. 13 may further be reverted back to a standard size and display. For example, selection of an icon in the companion window 1201 of FIG. 12 may return the companion window and host window to the original proportions.

It is understood that aspects of the present description can take many forms and embodiments. The embodiments shown herein are intended to illustrate rather than to limit the description, it being appreciated that variations may be made without departing from the spirit of the scope of the invention. Although illustrative embodiments have been shown and described, a wide range of modification, change and substitution is intended in the foregoing disclosure and in some instances some features may be employed without a corresponding use of the other features. Accordingly, it is appropriate that the appended claims be construed broadly and in a manner consistent with the scope of the invention.

The invention claimed is:

1. A method performed on a computing device, the method comprising:
   obtaining, by a companion application that is being executed by the computing device, metadata that is descriptive of data being displayed in a user interface of a host application that is also being executed by the computing device, where the host application is separate from and substantially unaware of the companion application; and
   displaying, by the companion application, the obtained metadata in a user interface of the companion application.

2. The method of claim 1 further comprising concurrently displaying the user interface of the companion application and the user interface of the host application that comprises a representation of the data.

3. The method of claim 2 where the concurrently displaying comprises displaying the user interface of the companion application and the user interface of the host application adjacent to each other.

4. The method of claim 2 where the concurrently displaying comprises modifying, in tandem and in response to a change in the data, the user interface of the companion application and the user interface of the host application.

5. The method of claim 2 where the concurrently displaying comprises presenting the user interface of the companion application and the user interface of the host application as a single user interface.

6. The method of claim 1 where the obtaining the metadata is in response to detecting, by the companion application, a selection in the user interface of the host application.

7. The method of claim 6 where the detecting comprises hooking, by the companion application, into the host application.

8. A computing device comprising:
a processor;
memory coupled to the processor;
a companion application implemented at least in part by the processor and the memory, and configured to obtain metadata that is descriptive of data of a host application also implemented at least in part by the processor and the memory, where the host application is separate from and substantially unaware of the companion application; and
the companion application further configured to display the obtained metadata in a user interface of the companion application.

9. The computing device of claim 8 configured to concurrently display the user interface of the companion application and the user interface of the host application.

10. The computing device of claim 9 where the user interface of the companion application is concurrently displayed adjacent to the user interface of the host application.

11. The computing device of claim 9 configured to modify in tandem, in response to a change in the data, the user interface of the companion application and the user interface of the host application.

12. The computing device of claim 9 configured to present the user interface of the companion application and the user interface of the host application as a single user interface.

13. The computing device of claim 8, the companion application further configured to monitor the data of the host application.

14. The computing device of claim 13 where the companion application monitors the host application based on hooking into the host application.

15. At least one computer storage media that is an article of manufacture and that stores computer-executable instructions that, based on execution by a computing device, configures the computing device to perform actions comprising:
obtaining, by a companion application that is being executed by the computing device, metadata that is descriptive of data being displayed in a user interface of a host application being executed by the computing device, where the host application is separate from and substantially unaware of the companion application; and
displaying, by the companion application, the obtained metadata in a user interface of the companion application.

16. The at least one computer storage media of claim 15, the actions further comprising concurrently displaying the user interface of the companion application and the user interface of the host application that comprises a representation of the data.

17. The at least one computer storage media of claim 16 where the concurrently displaying comprises displaying the user interface of the companion application and the user interface of the host application adjacent to each other.

18. The at least one computer storage media of claim 16 where the concurrently displaying comprises modifying, in tandem and in response to a change in the data, the user interface of the companion application and the user interface of the host application.

19. The at least one computer storage media of claim 16 where the concurrently displaying comprises presenting the user interface of the companion application and the user interface of the host application as a single user interface.

20. The at least one computer storage media of claim 15, the actions further comprising monitoring, by the companion application, the data of the host application, where the monitoring comprises hooking, by the companion application, into the host application.

* * * * *